(No Model.)
T. ARTHUR.
APPARATUS FOR RAISING WATER.
No. 308,819. Patented Dec. 2, 1884.
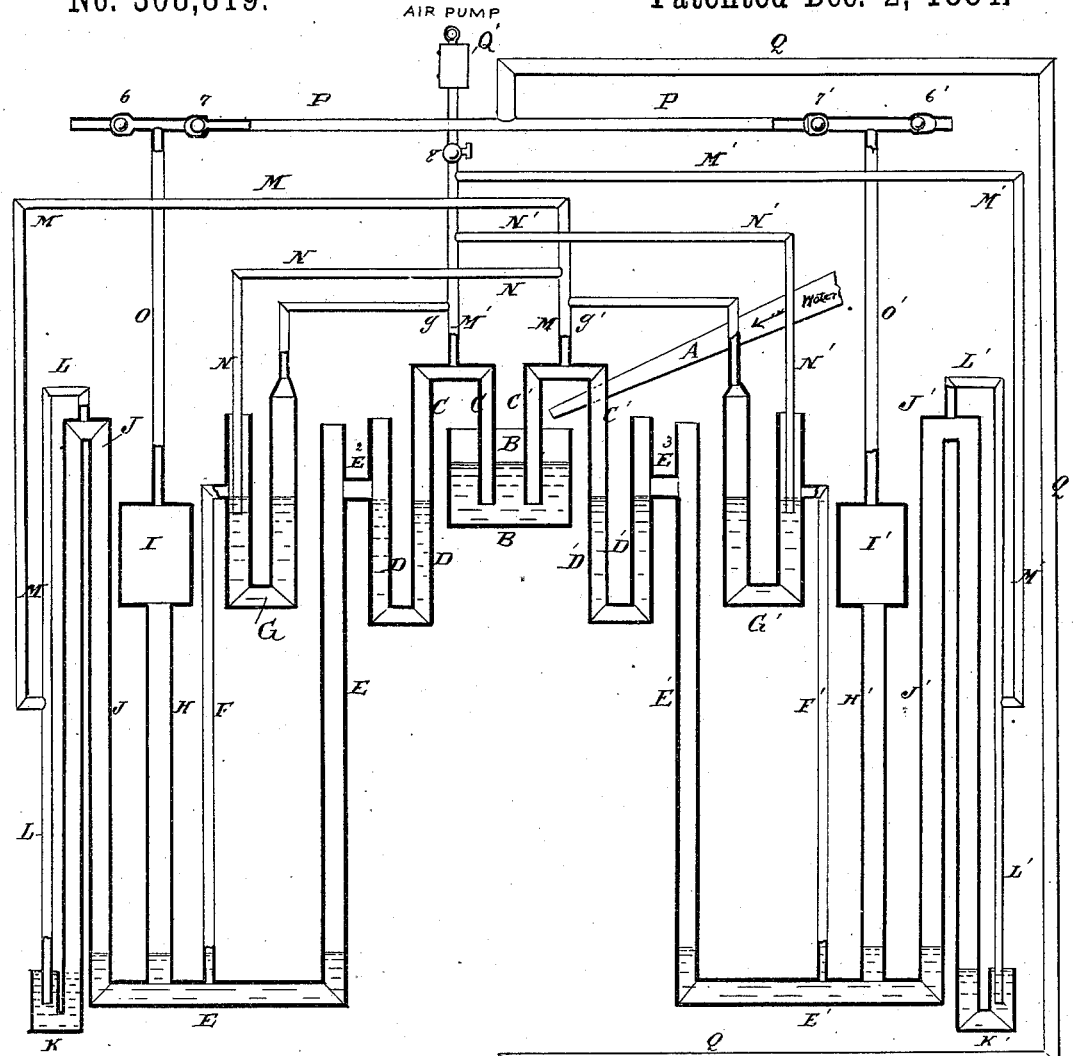
WITNESSES:
INVENTOR:
T. Arthur
BY Munn & Co
ATTORNEYS.

UNITED STATES PATENT OFFICE.

THOMAS ARTHUR, OF BANGOR, PENNSYLVANIA, ASSIGNOR TO HIMSELF AND ROBERT JAMES NAGLE, OF SAME PLACE.

APPARATUS FOR RAISING WATER.

SPECIFICATION forming part of Letters Patent No. 308,819, dated December 2, 1884.

Application filed March 7, 1884. (No model.)

*To all whom it may concern:*

Be it known that I, THOMAS ARTHUR, of Bangor, in the county of Northampton and State of Pennsylvania, have invented a new and Improved Apparatus for Raising Water, of which the following is a full, clear, and exact description.

Reference is to be had to the accompanying drawing, forming part of this specification, and which is a side elevation of my improvement, partly in section.

The object of this invention is to facilitate the raising of water from mines and other places.

The invention consists in a combination of tanks, siphons, inverted siphons, water-pipes, air-pipes, levers, floats, valves, and a stop-cock, whereby the withdrawal of air from the initial siphons successively will cause a continuous raising of water, as will be hereinafter fully described.

A represents a pipe, through which water from a stream or other source of supply flows into a tank, B.

C C' are two siphons, one arm of each of which is inserted in the tank B, and their other arms are connected with the arms of two inverted siphons, D D'. The other arms of the inverted siphons D D' are extended upward, have open ends, and are connected below the bends of the siphons C C', by short pipes $E^2$ $E^3$, with the pipes E E', below the open upper ends of the said pipes E E'. The lower parts of the pipes E E' are bent outward, and with the said parts are connected the lower ends of the small pipes F F', the large pipes H H', and arms of the siphons J J'. The upper ends of the small pipes F F' are connected with arms of the inverted siphons G G' below the open ends of the said arms. The upper ends of the pipes H H' are connected with the lower parts of the tanks I I'. The other arms of the siphons J J' are connected with arms of the inverted siphons K K'. The other arms of the inverted siphons K K' are short, are open at the ends, and in them are inserted the ends of the small pipes L L', the other ends of which are connected with the bends of the siphons J J'.

With the pipes L L' are connected the ends of the small bent pipes M M', the other ends of which are connected with the bends of the siphons C' C.

With the pipes M M' are connected the ends of the small bent pipes N N', the other ends of which are inserted in the open arms of the inverted siphons G G', and are extended below the ends of the pipes F F'. The other arms of the inverted siphons G G' are extended, and are connected with the pipes M' M.

With the upper parts of the tanks I I' are connected the lower ends of pipes O O', the upper ends of which are connected with the pipe P near its open ends. With the middle part of the pipe P is connected the end of the bent pipe Q, the other end of which is connected with the middle part of the pipe R. The ends of the pipe R are connected with the upper parts of the tanks S S', with the lower parts of which are connected the upper ends of the suction-pipes T T'. The pipes T T' extend down to the place from which the water is to be raised, and with the upper parts of the said pipes are connected the ends of the discharge-pipes U U'.

To a standard, V, connected with the tanks S S' or other suitable support, is pivoted the center of an equal-armed lever, W, the ends of which are connected by the stems of the valves 1 1' with levers X X', placed in the tanks S S', and pivoted at one end to supports attached to the said tanks. To the other ends of the levers X X' are pivoted the upper ends of hanging rods Y Y', upon which are placed sliding floats Z Z'. The hanging rods Y Y' have cross-heads or other stops at their lower ends, to prevent the floats Z Z' from dropping off. The valves 1 1' are placed in short open pipes 2 2', placed in the tops of the tanks S S', and open upward.

With the levers X X' are also connected valves 3 3', placed in the ends of the pipe R, and opening downward. The float Z is made a little heavier than the float Z', so that when left free the valves 3 1' will be closed and the valves 3' 1 will be open.

In the suction-pipes T T', a little below the discharge-pipes U U', are placed valves 4 4', opening upward, and in the discharge-pipes U U' are placed valves 5 5', opening outward.

In the pipe P, at the outer sides of the pipes O O', are placed valves 6 6', opening outward, or from the pipes O O', and in the said pipe P, at the inner sides of the pipes O O', are placed valves 7 7', opening inward, or toward the said pipes O O'.

With the pipe M' is connected a stop-cock, 8, through which the air can be withdrawn from the siphon C with a suction-pump or other suitable means.

In using the apparatus, water is admitted through the supply-pipe A into the tank B, and water is poured into the inverted siphons D D' G G' K K' through their open ends, and into the lower parts of the pipes E E' F F' H H' J J' through the open ends of the pipes E E'. The stop-cock 8 is then opened, and the air is withdrawn by an air-pump or other suitable means, Q', from the pipe M' until the water rises into the bend of the siphon C, or a little above it, but not so high as the point g, where the end of the inverted siphon G joins the pipe M'. The stop-cock 8 is then shut, and the water flows through the siphon C and the inverted siphon D into the pipe E, and rises in the pipes F H J, filling the tank I, rising a little in the inverted siphon G, filling the pipe J to its bend, and flowing out through the open end of the inverted siphon K. The outflow of the water through the siphon J withdraws the air through the pipes L M from the siphon C', and causes the water to rise into the bend of the said siphon C', and in the arm of the inverted siphon G', connected with the pipe M at g', and consequently lowers the water in the other arm of the said inverted siphon G' below the end of the pipe N', admitting air into the siphon C, and stopping the outflow of water through the said siphon C. As the water continues to flow from the tank I through the siphon J, a vacuum is formed in the pipes O P Q R and tank S, and the water will rise through the pipe T into the said tank S until it raises the float Z against the lever X, and operates the said lever to close the valves 3 1' and open the valves 3' 1, which admits air to the tank S, and allows the water to open the valve 5 and flow out through the pipe U, while at the same time the water rises in the tank S', the water rising into and being discharged from the tanks S S' successively.

It will be observed that when the water rises in the tanks I I' the air in the said tanks is forced out through the pipes O O', closes the valves 7 7', opens the valves 6 6', and escapes; and when the water is flowing out of the tanks I I' the air-pressure closes the valves 6 6' and opens the valves 7 7', so that a supply of air for the tanks I I' can only be had from the tanks S S'. With this construction, when the apparatus is once set in operation, it will continue to operate until the supply of water for the pipes T T' is exhausted, or air is admitted by opening the cock 8.

Having thus described my invention, I claim as new and desire to secure by Letters Patent—

An apparatus for raising water, constructed substantially as herein shown and described, and consisting of the combination of the tanks B I I' S S', the siphons C C' J J', the inverted siphons D D' G G' K K', the water-pipes E F H T T' U U', the air-pipes L L' M M' N N' O O' P Q R, the levers W X X', the floats Z Z', the valves 1 1', 3 3', 4 4', 5 5', 6 6', and 7 7', and the stop-cock 8, whereby the withdrawal of air from the united siphons successively will cause a continuous raising of water, as set forth.

THOMAS ARTHUR.

Witnesses:
R. J. NAGLE,
MONROE WILSON.